United States Patent
Paul et al.

(10) Patent No.: US 7,500,205 B2
(45) Date of Patent: Mar. 3, 2009

(54) SKEW REDUCTION FOR GENERATED CLOCKS

(75) Inventors: Gael Paul, Menlo Park, CA (US); Kenneth McElvain, Menlo Park, CA (US)

(73) Assignee: Synopsys, Inc., Mountain View, CA (US)

(*) Notice: Subject to any disclaimer, the term of this patent is extended or adjusted under 35 U.S.C. 154(b) by 433 days.

(21) Appl. No.: 11/333,891

(22) Filed: Jan. 17, 2006

(65) Prior Publication Data
US 2006/0129961 A1    Jun. 15, 2006

Related U.S. Application Data

(63) Continuation-in-part of application No. 10/640,932, filed on Aug. 13, 2003, now Pat. No. 7,082,582, which is a continuation-in-part of application No. 10/016,214, filed on Dec. 6, 2001, now Pat. No. 6,643,829.

(51) Int. Cl.
*G06F 17/50* (2006.01)

(52) U.S. Cl. ................ 716/3; 716/4; 716/5; 716/6; 703/19

(58) Field of Classification Search .......... 716/3–6; 703/19
See application file for complete search history.

(56) References Cited

U.S. PATENT DOCUMENTS

| | | | | |
|---|---|---|---|---|
| 5,153,848 | A | * | 10/1992 | Elkind et al. ............ 708/503 |
| 5,452,239 | A | * | 9/1995 | Dai et al. ............... 703/19 |
| 5,801,955 | A | | 9/1998 | Burgun et al. |
| 5,831,866 | A | | 11/1998 | Burgun et al. |
| 5,956,256 | A | | 9/1999 | Rezek et al. |
| 5,966,523 | A | | 10/1999 | Uchino |
| 6,134,670 | A | * | 10/2000 | Mahalingaiah ........... 713/401 |
| 6,301,553 | B1 | | 10/2001 | Burgun et al. |
| 6,396,307 | B1 | | 5/2002 | Kawakami et al. |
| 6,434,722 | B2 | | 8/2002 | Kawarabayashi et al. |
| 6,546,539 | B1 | | 4/2003 | Lu et al. |
| 6,643,829 | B1 | * | 11/2003 | Borkovic et al. ........... 716/3 |
| 7,082,582 | B1 | * | 7/2006 | Borkovic et al. ........... 716/3 |

* cited by examiner

*Primary Examiner*—Naum B Levin
(74) *Attorney, Agent, or Firm*—SoCal IP Law Group LLP; Steven C. Sereboff; John E. Gunther (57) ABSTRACT

There is disclosed systems and processes for optimizing circuit descriptions by reducing clock skew, re-organizing and/or converting gated and generated clock circuits, and reconnecting clock nets and other related nets. A transformed circuit design may be produced from an initial circuit design and having a reduced number of secondary clocks and a reduced amount of clock skew.

51 Claims, 9 Drawing Sheets

SKEW REDUCTION FOR GENERATED CLOCKS

RELATED APPLICATION INFORMATION

This patent is a continuation-in-part of application Ser. No. 10/640,932 filed Aug. 13, 2003, now U.S. Pat. No. 7,082,582 B1, which is a continuation of application Ser. No. 10/016,214 filed Dec. 6, 2001, now U.S. Pat. No. 6,643,829, all of which are incorporated herein by reference.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by any one of the patent disclosure as it appears in the Patent and Trademark Office patent files or records, but otherwise reserves all copyright and trade dress rights whatsoever.

BACKGROUND OF THE INVENTION

1. Field of the Invention

The present invention relates to clocked circuits.

2. Description of the Related Art

Synchronous sequential circuits rely on their clock signals for reliable operations. Clocked sequential elements such as flip-flops or registers transfer input data to output data at the transition of the clock signal. For proper loading, the input data have to meet the set-up and hold time requirements. Since these critical timing parameters are determined with respect to the clock signal, any clock skew or delay may cause timing violations, resulting in erroneous data loading. Delay is an amount of time by which a signal is retarded from a first point to a second point. Skew is a measure of divergence of the delay of a signal into two circuits. Clock skew is typically due to two causes. The first is uncontrolled differences in material and topology of the clock net. The second is the amount of delay introduced by the circuitry that generates a derived clock from a parent clock. Ideal clock delay and ideal clock skew are zero, and non-zero delay and skew typically must be compensated for. Clock skews and delays may also limit the operating frequency range, leading to degraded performance.

There are several sources that may cause clock skew in sequential circuits. One of the major sources is the use of gating circuitry to selectively enable or disable the clock signal. A typical gating circuitry may involve several levels of gating circuits, often in the form of AND or OR gates. These gates may introduce undesirable delays and cause unpredictable timing problems.

Routing is one source of delay. The problem is even more pronounced when circuits are prototyped in programmable devices such as field programmable logic arrays (FPGAs). In these programmable logic devices, the gated clock signals are typically routed on the general routing network due to the limited number of available dedicated clock routing networks. The general routing network usually introduces significant and unequal delays in the distribution of clocking signals to various sequential elements, causing clock skews at the clock inputs of the sequential elements.

One technique to reduce clock skew is to use delay elements at various points in the clock signal paths to compensate for the unequal delays. This technique increases the amount of hardware and circuit complexity. In addition, the delay elements may have their own delay variations which may not compensate well. Finally, this technique is typically not applicable in FPGAs.

DETAILED DESCRIPTION OF THE INVENTION

Throughout this description, the embodiments and examples shown should be considered as exemplars, rather than limitations on the apparatus and methods of the present invention.

Description of Systems

Figure 1:
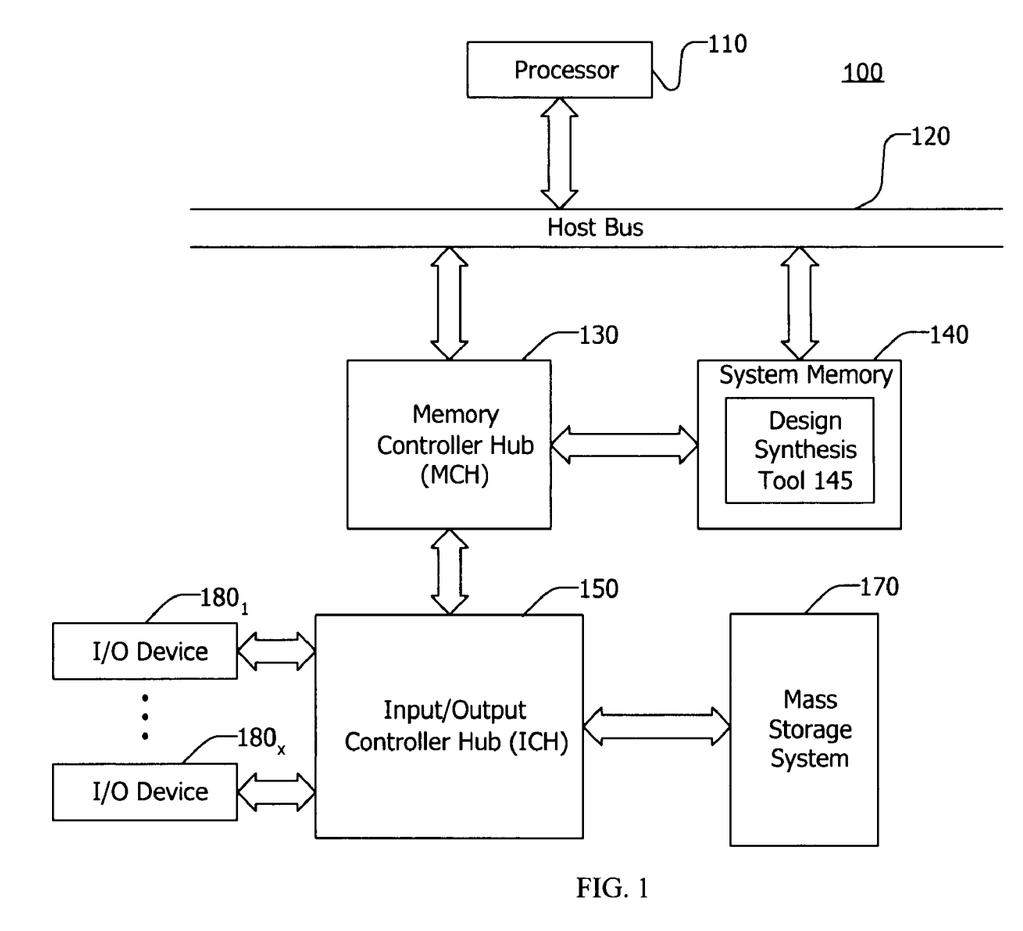
FIG. 1 is a block diagram of a computer system.

Referring now to FIG. 1 there is shown a block diagram of a computer system 100. The computer system 100 includes a processor 110, a host bus 120, a memory control hub (MCH) 130, a system memory 140, an input/output control hub (ICH) 150, a mass storage system 170, and input/output devices $180_1$ to $180_K$.

The processor 110 represents a central processing unit of any type of architecture, such as embedded processors, micro-controllers, digital signal processors, superscalar computers, vector processors, single instruction multiple data (SIMD) computers, complex instruction set computers (CISC), reduced instruction set computers (RISC), very long instruction word (VLIW), or hybrid architecture.

The host bus 120 provides interface signals to allow the processor 110 to communicate with other processors or devices, e.g., the MCH 130. The host bus 120 may support a uni-processor or multiprocessor configuration. The host bus 120 may be parallel, sequential, pipelined, asynchronous, synchronous, or any combination thereof, or other design.

The MCH 130 provides control and configuration of memory and input/output devices such as the system memory 140 and the ICH 150. The MCH 130 may be integrated into a chipset that integrates multiple functionalities such as the isolated execution mode, host-to-peripheral bus interface, and memory control. The computer system 100 may include peripheral buses such as Peripheral Component Interconnect (PCI), accelerated graphics port (AGP), Industry Standard Architecture (ISA) bus, and Universal Serial Bus (USB).

The system memory 140 stores system code and data. The system memory 140 may be implemented, for example, with dynamic random access memory (DRAM) or static random access memory (SRAM). The system memory 140 may include a design synthesis tool 145. The design synthesis tool 145 may be implemented by hardware, software, firmware, microcode, or any combination thereof. The system memory 140 may include other programs or data which are not shown, such as an operating system.

The ICH 150 has a number of functionalities that are designed to support I/O functions. The ICH 150 may be integrated into a chipset together or separate from the MCH 130 to perform I/O functions. The ICH 150 may include a number of interface and I/O functions such as PCI bus interface, processor interface, interrupt controller, direct memory access (DMA) controller, power management logic, timer, universal serial bus (USB) interface, mass storage interface, low pin count (LPC) interface, etc.

The mass storage system 170 stores archive information such as code, programs, files, data, applications, and operating systems. The mass storage system 170 may be or include a permanent, removable or partially removable medium that can store or transfer information, and may further include apparatus for reading and/or writing to the medium. Examples of the mass storage system 170 include an electronic circuit, a semiconductor memory device, a ROM, a flash memory, an erasable programmable ROM (EPROM), a floppy diskette, a compact disk CD-ROM, an optical disk, a hard disk, a fiber optic medium, a radio frequency (RF) link, and/or other memory devices.

The computer data signal may include any signal that can propagate over a transmission medium such as electronic network channels, optical fibers, air, electromagnetic, RF links, etc. The code segments may be downloaded via computer networks such as the Internet, an intranet, etc.

The computer system 100 may be implemented by hardware, software, firmware, microcode, or combinations thereof, all for providing functionality and features described herein. The computer system 100 may include one or more of: logic arrays, memories, analog circuits, digital circuits, software, firmware, and processors such as microprocessors, FPGAs, ASICs, PLDs and PLAs. The hardware and firmware components of the computer system 100 may include various specialized units, circuits, software and interfaces for providing the functionality and features described here. The hardware and software of the invention and its functions may be distributed such that some components are performed by the computer system 100 and others by other apparatus and systems. Additional and fewer units, modules or other arrangement of software, hardware and data structures may be used to achieve the device described herein.

The invention may be embodied in whole or in part in software which operates on the computer system 100 and may be in the form of firmware, an application program, an applet (e.g., a Java applet), a browser plug-in, a COM object, a dynamic linked library (DLL), a script, one or more subroutines, or an operating system component or service. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc. The program or code segments may be stored in the mass storage system 170 or transmitted by a computer data signal embodied in a carrier wave, or a signal modulated by a carrier, over a transmission medium.

Figure 2:
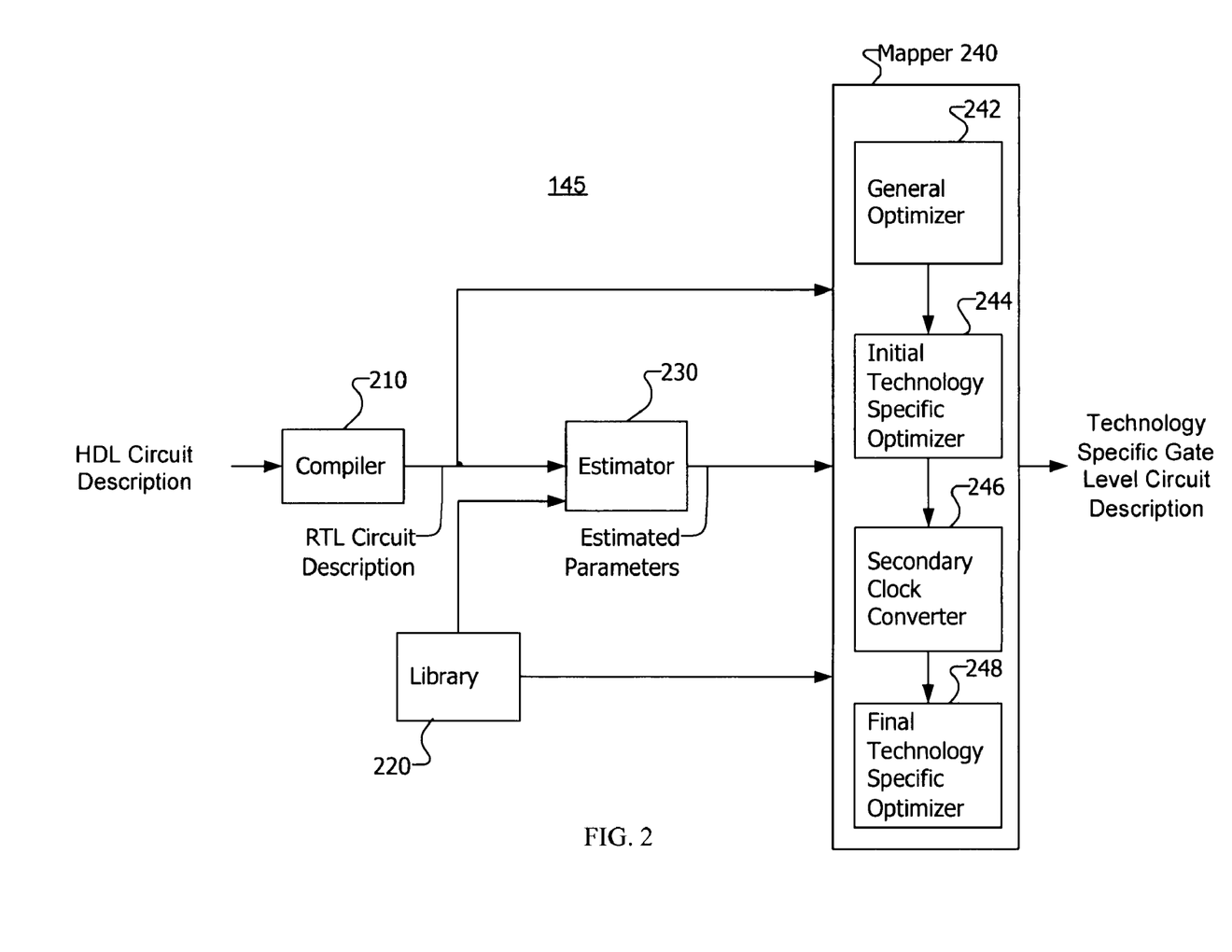
FIG. 2 is a block diagram of a design synthesis tool.

Referring now to FIG. 2 there is shown a block diagram of the design synthesis tool 145. The design synthesis tool 145 includes a compiler 210, a library 220, an estimator 230 and a mapper 240. The design synthesis tool 145 may be a software package in a computer aided design (CAD) environment. The design synthesis tool 145 may be used by design engineers for designing, synthesizing and simulating a circuit or a project. The design synthesis tool 145 may be used as part of a design process for Applications Specific Integrated Circuit (ASIC) devices, programmable device such as programmable logic devices (PLD), complex PLDs (CPLD), field programmable logic arrays (FPGAs), and other devices and circuits.

The design synthesis tool 145 may be used to create, enhance, translate, and/or modify an initial circuit design. The initial circuit design has at least one input (i.e. top level port), referred to herein as a primary port.

Clocks which are primary ports are referred to herein as primary clocks. The initial circuit design has at least one primary clock and an initial number of secondary clocks. Secondary clocks are derived from one or more of the primary clocks and other secondary clocks. The secondary clocks may be gated clocks and/or generated clocks. The initial circuit design also may have one or more sequential elements clocked by the secondary clocks. The initial circuit design has an initial amount of clock skew associated with clocking the sequential elements from the secondary clocks.

The compiler 210 compiles a source program containing a hardware description language (HDL) circuit description of the initial circuit design. The initial circuit design may have a primary clock, which is a clock received from an external source. The HDL may be any appropriate HDL, for example Very High Speed Integrated Circuit Hardware Description Language (VHDL) or Verilog. The compiler 210 generates a register transfer level (RTL) circuit description from the HDL circuit description.

The library 220 may contain previously compiled circuit descriptions, vendors' circuit descriptions, functions, packages, or other useful components that can be linked, combined, and integrated with the current RTL circuit description.

The estimator 230 estimates functional and/or physical parameters related to the circuit or project. Some examples of the parameters include the circuit complexity (e.g., number of gates), circuit size, power consumption, overall timings, etc. The estimator 230 receives the RTL circuit description from the compiler 210 and other information from the library 220 to generate the estimated parameters.

The mapper 240 generates technology-specific gate level circuit description from the post-partition RTL circuit description and other useful information from the library 220. The mapper 240 may also generate the technology-specific gate level circuit description directly from the RTL circuit description and the library information. The mapper 240 includes a general optimizer 242, an initial technology specific optimizer 244, a secondary clock converter 246, and a final technology specific optimizer 248.

The general optimizer 242 optimizes the gate level circuit description without considering the specific technology or device in which the circuit will eventually be implemented.

The initial technology specific optimizer 244 performs the initial optimization based on the general optimization.

The secondary clock converter 246 further optimizes the circuit description by reducing clock skew, re-organizing and/or converting gated and generated clock circuits, and reconnecting clock nets and other related nets. The secondary clock converter 246 includes the gated clock converter described in the patent applications referenced above. The secondary clock converter 246 produces a transformed circuit design from the initial circuit design having a reduced number of secondary clocks and reduced amount of clock skew. The secondary clock converter 246 may be a program, a function, a subprogram, a procedure, or a routine which, when executed, causes the processor 110 to perform the tasks as described herein and in the referenced patent applications.

The final technology specific optimizer 248 generates the final optimized gate level circuit description specific to the technology to be used, such as that for the specific selected device.

The final optimized gate level circuit description may then be simulated and downloaded into the specific device for physical implementation.

One aspect of a circuit which may be improved is the clocking of sequential elements. A sequential element is a digital device which maintains some history of its past state or past performance. Many types of memory devices may be sequential elements, including flip-flops, RAMs, ROMs, and latches. Sequential elements may be volatile or nonvolatile, and clocked (synchronous) or un-clocked (asynchronous). A sequential element has at least one data input and at least one output. The data inputs may be received on respective input pins, and the outputs provided on respective output pins. Synchronous sequential elements have a clock input, and may be edge triggered—either at the rising or falling edge of the clock signal on the clock input, or level sensitive—either active high or active low.

The clock for a synchronous sequential element may be generated and/or gated. Generated and gated clocks are based upon another, input clock, referred to herein as a master clock. The master clock may be a primary clock or a secondary clock. A gated clock has the same waveform as its master clock, though for some periods the gated clock may be turned off, i.e. have no change in output. A generated clock has a different waveform from its master clock, and may be a multiple or fraction of its master clock. A generated clock will have an insertion delay, which is the delay from the time of the master clock to the time of the generated clock.

To provide the generated and/or gated clock signal having the desired waveform, there may be a respective clock circuit. A generated clock circuit may include one or more sequential elements and/or internal clock generators, such as a PLL, frequency divider or pulse generator, but could be formed from only combinatorial logic. A gated clock circuit includes gating circuitry which combines its master clock signals with control (gating) signals. Generated clock circuits may include features of gated clock circuits.

A gated clock circuit satisfies two conditions. First, for certain combinations of the gating signals, the gated clock is disabled (i.e., it does not change with master clock signal changes). This prevents the sequential element from changing its state. Second, for the remaining combinations of the gating signals, apart from the delay introduced by the gated clock circuit, the gated clock signal equals either the master clock signal. Thus, all gated clock signal transitions should result from only the master clock signal transitions, and no enable signal transition should result in a gated clock signal transition. To ensure such behavior, there is a value of the master clock signal where the gated clock signal is insensitive to an enable signal change.

Description of Methods

Figure 3:
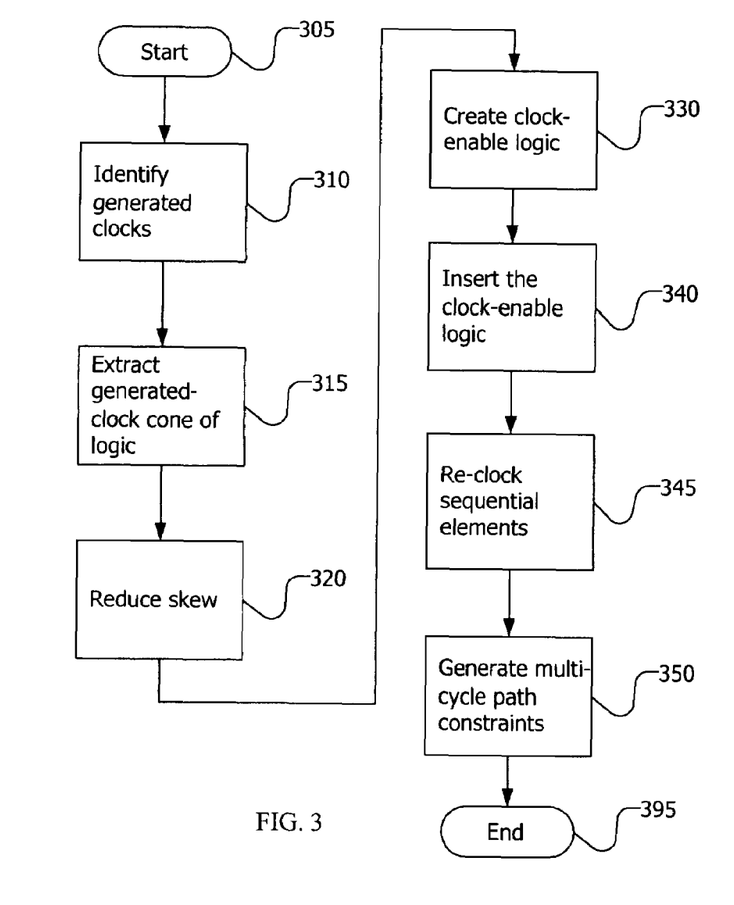
FIG. 3 is a flowchart of a process for transforming an initial circuit design.

Referring now to FIG. 3 there is shown a flowchart of a process for transforming an initial circuit design having one or more synchronous sequential elements. The flow chart has both a start 305 and an end 395, but the process can be cyclical in nature. The basic process has seven steps: identify generated clocks 310, extract generated-clock cone of logic 315, reduce skew 320, create clock-enable logic 330, insert the clock-enable logic 340, re-clock sequential elements 345, and generate multi-cycle path constraints 350. Each of these steps is discussed in turn. For simplicity, the process is described with respect to one selected sequential element in the initial circuit design.

It is noted that the invention may be described as a process which is usually depicted as a flowchart, a flow diagram, a structure diagram, or a block diagram. Although a flowchart may describe the operations as a sequential process, many of the operations can be performed in parallel, pipelined or concurrently. In addition, the order of the operations may be rearranged. A process is terminated when its operations are completed. A process may correspond to a method, a function, a procedure, a subroutine, a subprogram, etc. When a process corresponds to a function, its termination corresponds to a return of the function to the calling function or the main function.

Prior to processing the initial circuit design with respect to generated clocks, gated clocks in the initial circuit design may be converted to reduce the number of secondary clocks and clock skew.

In the step of identifying generated clocks 310, the type of clock connected to the clock input of the selected sequential element is identified. If the selected sequential element is not clocked by a generated clock, then processing with respect to the selected sequential element is not necessary, and processing with respect to the selected sequential element may terminate.

To identify a generated clock, backward propagation may be performed from the clock input of the selected sequential element. Backward propagation may be performed across inverters and buffers. A generated clock is reached at the point where backward propagation does not reach a top-level port.

In the step of extracting generated clock cone of logic 315, a fan-in cone of logic of the generated clock may be extracted from the initial circuit design. Extracting the fan-in cone of logic may include performing a backward propagation from the clock pin of the selected sequential element, through combinational logic, to primary inputs. A primary input of a logic cone is defined as a sequential element, a black-box or a top-level port.

Delays which underlie skew may arise from logic and/or routing delays of the generated clock circuit. Skew reduction can thus be achieved by reducing the size/delay of the generated clock circuit. Ideally, to eliminate skew, the generated clock circuit is completely eliminated. Thus, it is worthwhile to consider how to accomplish this.

One technique that may be used to reduce skew is to move the primary inputs forward as far as possible. In the step of reducing skew 320, registers at primary inputs of the generated clock circuit may be re-timed forward to reduce skew. Furthermore, even if a primary input is a sequential element that is not a register, it may be possible to re-time across it. For example, under certain circumstances, it may be possible to re-time across black boxes, memories and latches.

Figure 4:
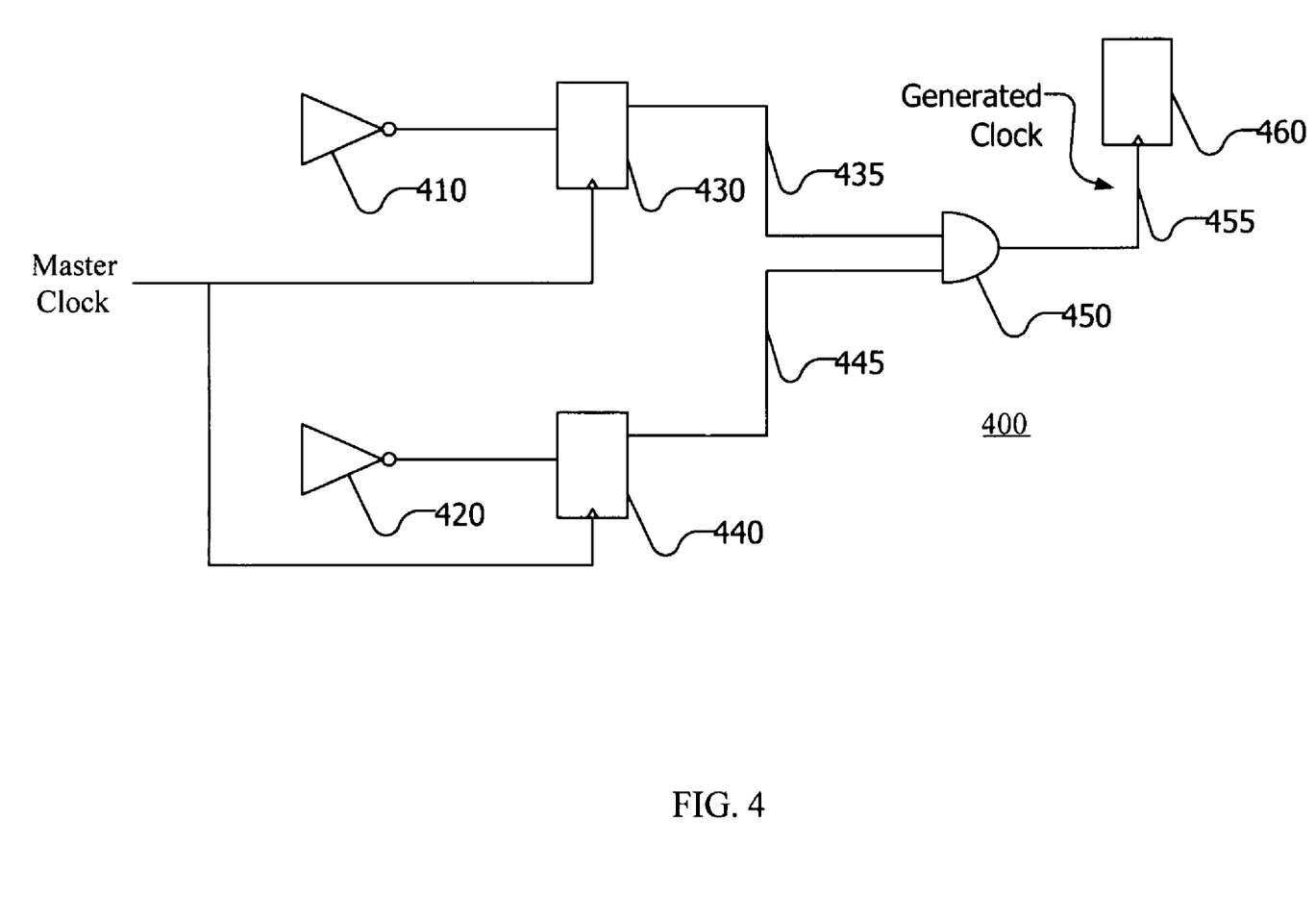
FIG. 4 is a circuit having sequential elements.

Referring now to FIG. 4 there is shown a circuit 400 having a synchronous sequential element, i.e., a flip flop 460. The flip flop 460 receives generated clock signals on line 455. The clock is a generated clock because it is the product of sequential elements 430 and 440 through the combinatorial AND gate 450. In accordance with the method described above, the circuit 400 is transformed to reduce clock skew to the flip flop 460. The flip flop 460 receives its clock signal from a combinational element, namely an AND gate 450. Continuing backwards through the combinational element 450, the sequential elements 430, 440 are identified. Then, the clocks for the sequential elements 430, 440 are identified. In this example, both sequential elements are clocked by the master clock. The sequential elements 430, 440 receive inputs from respective instances 410, 420. A skew exists between the sequential elements 430, 440 through the combinational element 450 on lines 435, 445. Elimination of this skew will improve performance of the circuit 400.

Figure 5:
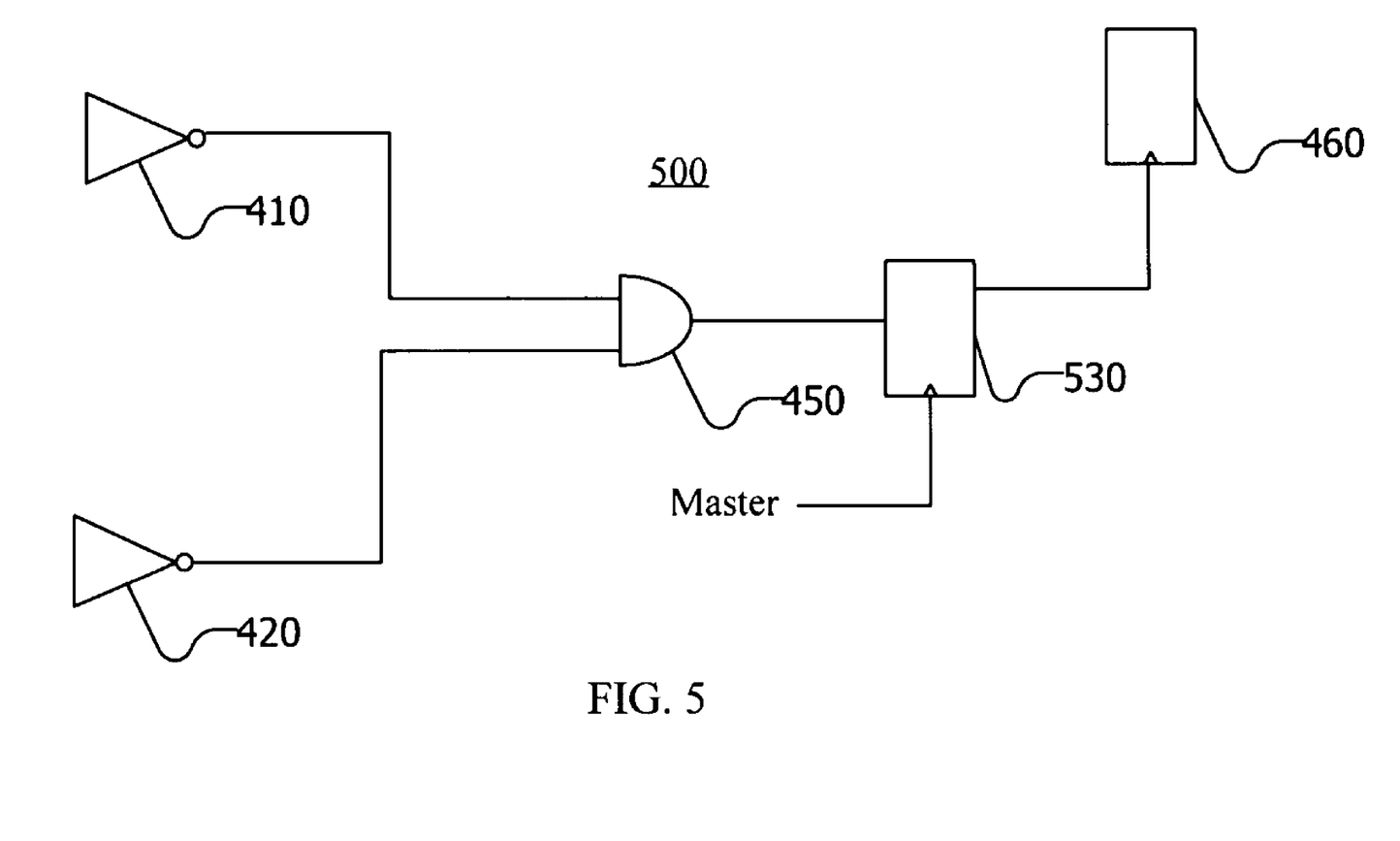
FIG. 5 is a retimed version of the circuit of FIG. 4.

The two sequential elements 430, 440 have the same clock, so the circuit 400 may be simplified by moving the sequential elements 430 and 440 across the AND gate and replacing the now redundant two sequential elements 430, 440 by a single sequential element 530. Referring now to FIG. 5, there is shown a retimed version 500 of the circuit of FIG. 4, with the AND gate 450 moved next to the inputs 410, 420 and a single sequential element 530 after the AND gate 450. With this retiming, the skew on lines 435, 445 (FIG. 4) is eliminated.

Figure 6:
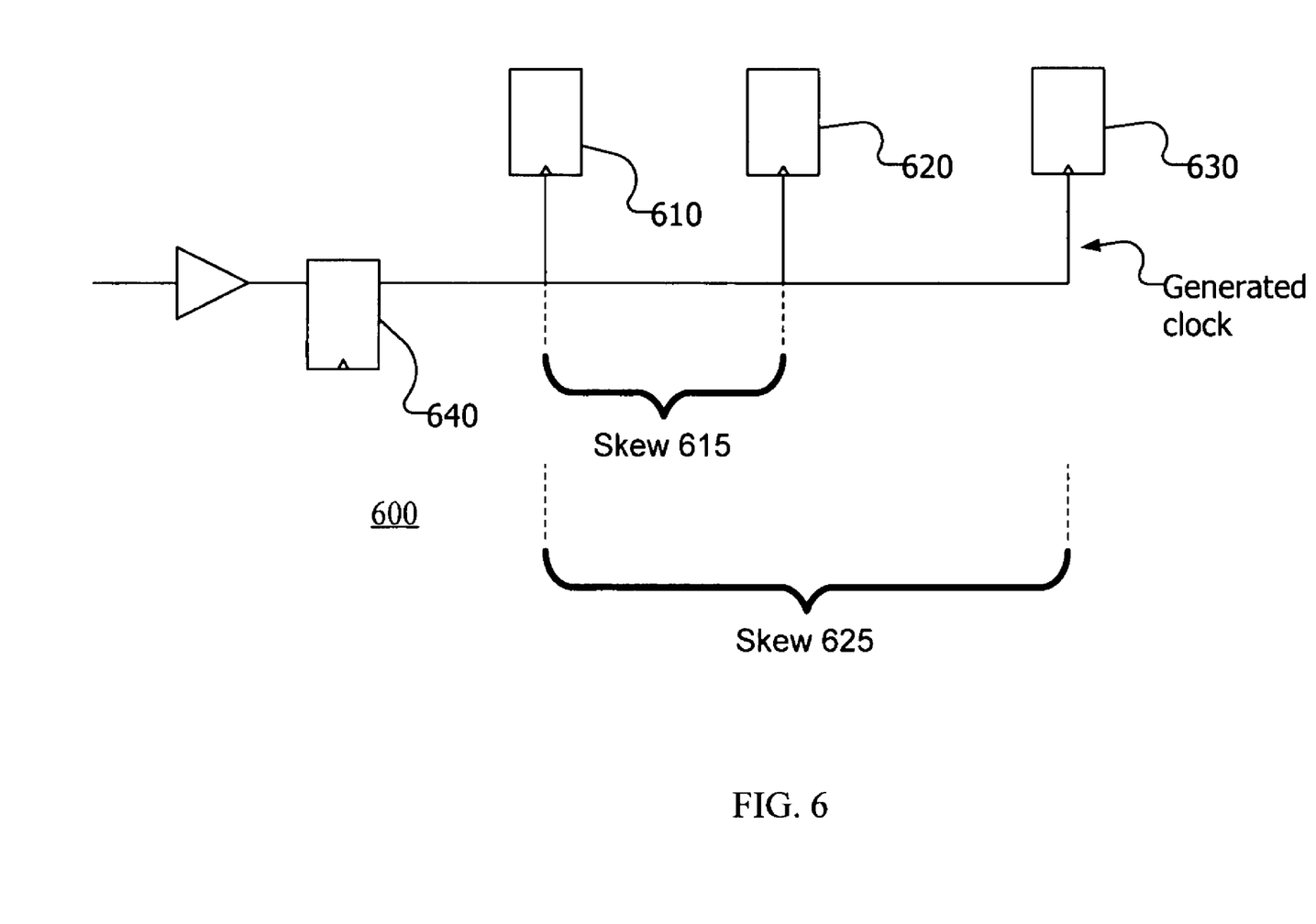
FIG. 6 is a circuit having sequential elements.

An additional technique that may be used to further reduce skew is logic replication of the retimed generated clock cone of logic. By providing a distinct copy of the generated clock logic for each sequential element, the clock routing delays can be minimized through spatial proximity. Moreover, in some cases, it may possible to have an identical topology for all the copies of the generated clock nets. This would essentially eliminate the clock skew. Turning now to FIG. 6, there is shown a circuit 600 having a number of sequential elements 610, 620, 630 connected to a generated clock source 640. Though the sequential elements 610, 620, 630 have the same clock, the clock signals to each may experience some measure of differing delay. If the circuit 600 is drawn to scale, then it becomes obvious that the downstream sequential elements 620, 630 have clock skew from the upstream element 610. For sequential element 620, the skew arises from the extra line 615. Likewise, for sequential element 630, the skew arises from the extra line 625.

Figure 7:
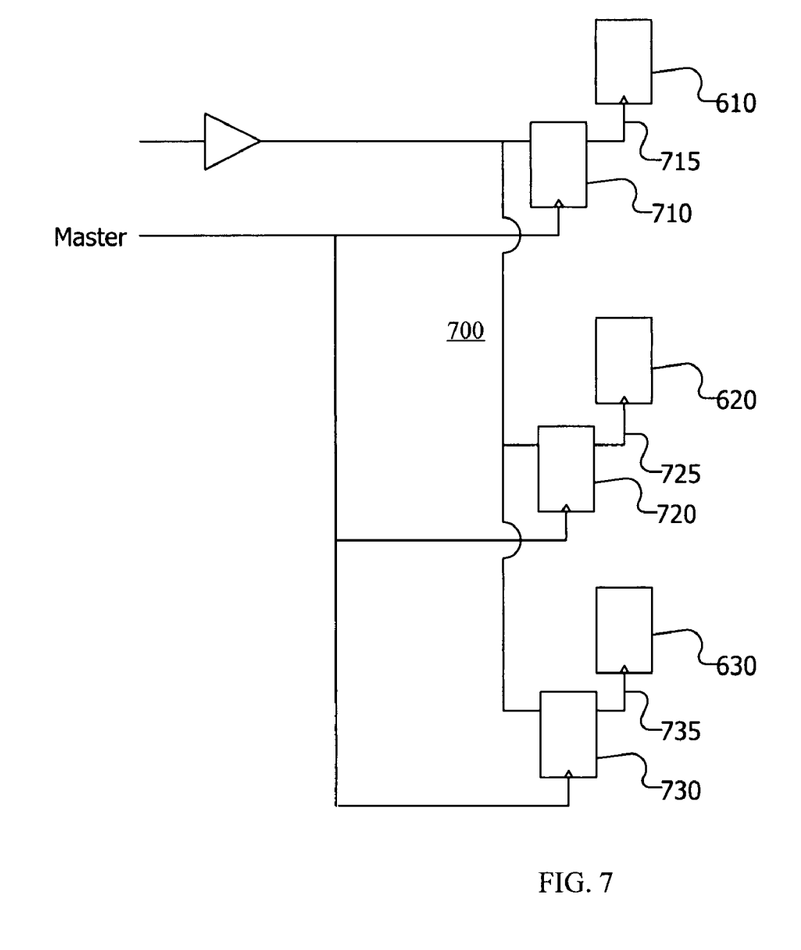
FIG. 7 is a retimed version of the circuit of FIG. 6.

In the circuit 700, FIG. 7, the generated clock logic 640 is replicated as generated clock sources 710, 720, 730 which provide generated clock signals to respective sequential elements 610, 620, 630. The skew that arose from the extra lines 615, 625 in FIG. 6 are eliminated, and the sequential elements 610, 620, 630 receive master clock signals on respective lines 715, 725, 735 having reduced relative delay (i.e., reduced skew). In some cases, it may be possible to make lines 715, 725 and 735 identical, thus eliminating local skew. Furthermore, the lines 715, 725, 735 can be make short to reduce the insertion delay.

If the cone of logic for the generated clock has been fully retimed to a single sequential element, then the remaining skew can be entirely eliminated. In the step of creating clock-enable logic 330, clock-enable logic is created. The clock-enable logic is created with two outputs which are used as clock-enables: one output is used to control rising-edge flip-flops (and active-low latches); a second output is used to control falling-edge flip-flops (and active-high latches). Thus, the clock-enable logic may have one rising-edge output and one falling-edge output. To provide rising-edge clock-enable signal, the clock-enable logic may include logic which performs NOT (output of the retimed generated clock sequential element) AND (input of the retimed generated clock sequential element). To provide falling-edge clock-enable signal, the clock-enable logic may include logic which performs (output of the retimed generated clock sequential element) AND NOT (input of the retimed generated clock sequential element).

In the step of inserting the clock-enable logic 340, the output of the clock-enable logic is connected to the selected sequential element, based on their polarity. There are at least two solutions if there is an existing clock-enable input. First, the new clock-enable may be combined with the existing clock-enable. Second, the old clock-enable may be moved to a data pin using a feedback multiplexer. Other solutions may be utilized.

In the step of re-clocking sequential elements 345, each sequential element driven by the selected generated clock is re-clocked from the generated clock to the generated clock's master clock. At this point, clock polarities of the selected sequential element may be inverted: flip-flops will have the same clock polarity than the retimed generated clock sequential element; latches will have the opposite polarity. For example, if the retimed generated clock sequential element is a falling-edge flip-flop, then every flip-flop re-clocked to the master clock becomes a falling-edge element, regardless of their original polarity.

Figure 8:
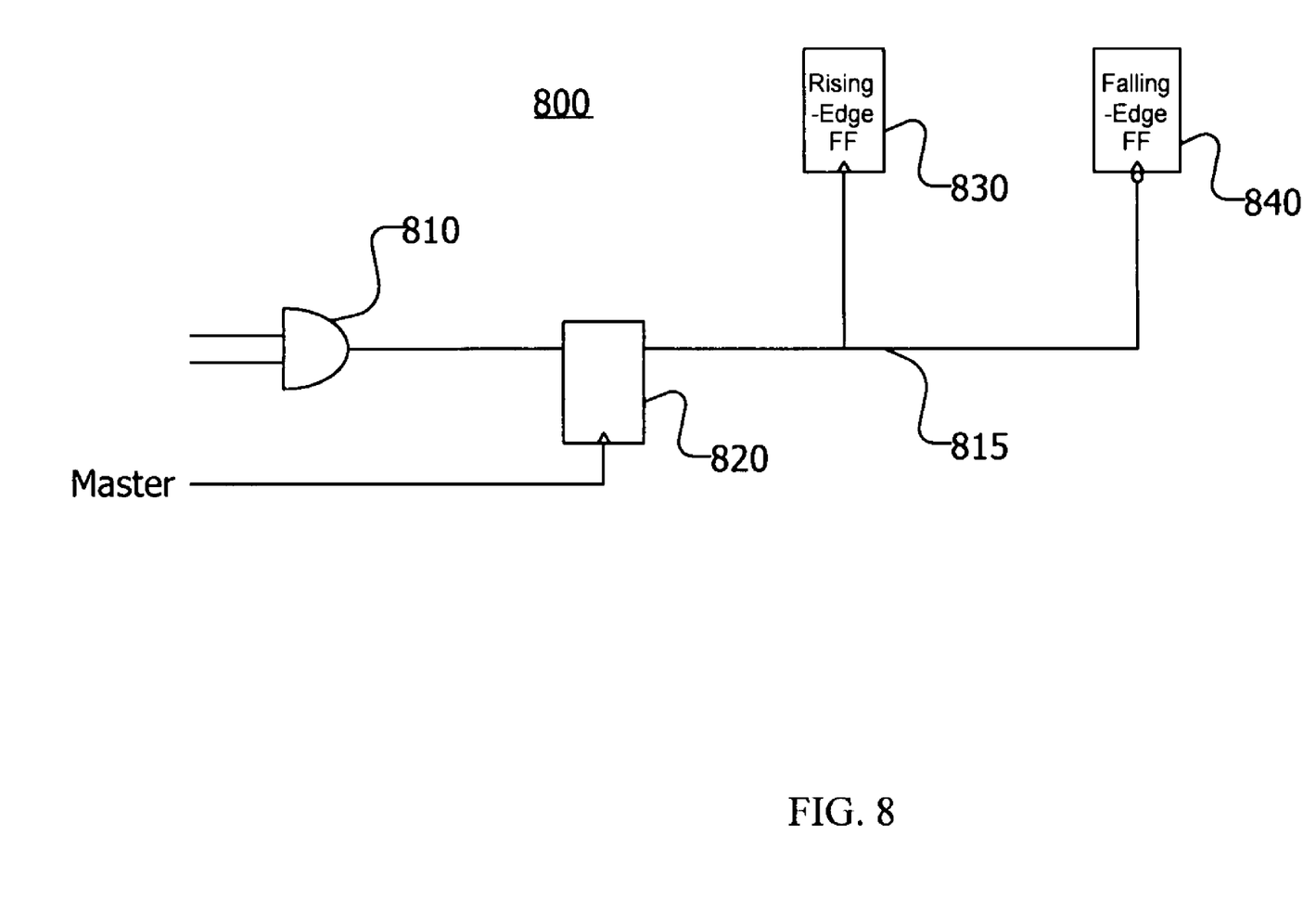
FIG. 8 is a circuit having sequential elements.
Figure 9:
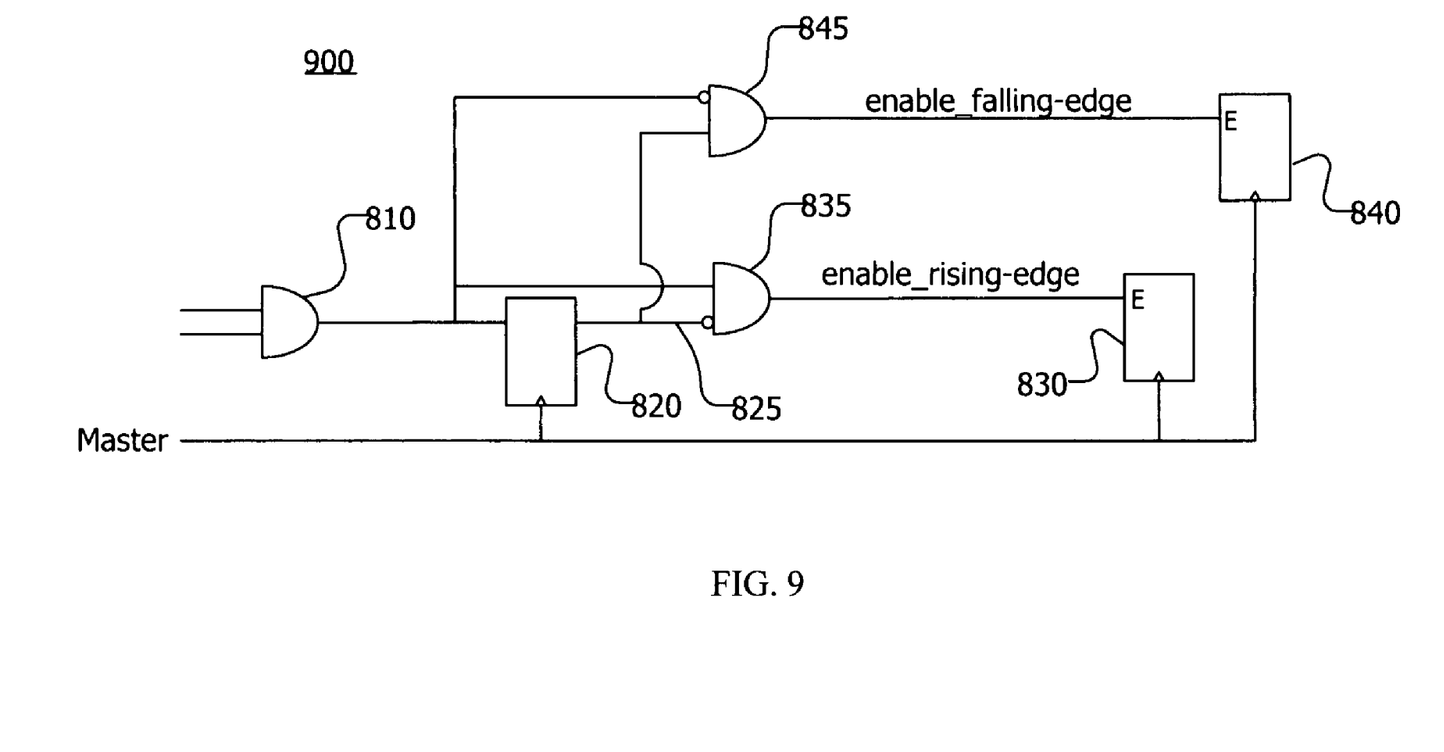
FIG. 9 is a retimed version of the circuit of FIG. 8.

Referring now to FIG. 8 there is shown a circuit 800 which is re-clocked in FIG. 9 as a circuit 900. The circuit 800 includes a flip-flop 820 which provides a generated clock on a line 815 to sequential elements, here a rising edge flip-flop 830 and a falling edge flip-flop 840. The flip-flop 820 is clocked by the master clock and receives as an input the output of an AND gate 810. In FIG. 9, the flip-flops 830, 840 have been re-clocked by the master clock. The polarity of flip-flop 840 has also been changed from falling-edge to rising-edge. As enable inputs, the flip-flops 830, 840 receive respective rising edge and falling edge clock-enable signals. To provide these new clock-enables, the outputs of the AND gate and the flip-flop 820 are provided to new AND gates 835, 845. These new AND gates each have a NOT on opposite inputs, as described above. Thus, in the circuit 900, the clock-enable logic has two outputs, one rising edge and the other falling edge.

In the step of generating multi-cycle path constraints 350, multi-cycle paths constraints are produced to preserve the timing requirements of the original circuit. A multi-cycle path is a path that operates on two or more clock cycles. A multi-cycle path may be specified from an origination register, to a destination register, or as passing through a net. The multi-cycle paths may be forward annotated in the transformed circuit design as multi-cycle path constraints for downstream implementation tools. Other solutions may utilized, such as assigning a virtual clock to the converted sequential elements, and defining clock period and clock-to-clock constraints that preserve the original timing requirements.

Multi-cycle paths may be identified from the multiply/divide ratio of the generated clock. This can be done through Boolean analysis, state traversal or even simulation techniques. Multiply/divide ratios may also be identified in user constraints. For example, user constraints may indicate a "divide by" ratio of master clock to generated clock. The initial circuit design may have timing requirements, and the multi-cycle path constraints may reflect these timing requirements.

In conjunction with generating multi-cycle path constraints, one or more user-defined multi-cycle constraints may be modified. For example, when a start or end points of a multi-cycle path are converted sequential elements, the original constraints may be modified to maintain the original timing requirements.

As an additional step in the process, a list of converted sequential elements may be created.

In accordance with the process, complex clocking structures may be converted to clock-enable structures, thereby significantly simplifying the clock tree requirements. All sequential elements in the initial circuit design, or some subset, may be processed as described above. Efficiencies may be obtained through cyclical and/or concurrent processing. For example, it may be desirable to group sequential elements in the initial circuit design according to their type, whether rising-edge or falling-edge triggered, whether active-low or active-high, the generated clocks to which they are connected, and/or other qualities. Grouped sequential elements may be processed together, and it may be beneficial to process groups of sequential elements in a particular order.

Closing Comments

The foregoing is merely illustrative and not limiting, having been presented by way of example only. Although exemplary embodiments of the invention have been shown and described, it will be apparent to those having ordinary skill in the art that changes, modifications, and/or alterations may be made, none of which depart from the spirit of the present invention. All such changes, modifications and alterations should therefore be seen as within the scope of the present invention.

Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

For any means-plus-function limitations recited in the claims, the means are not intended to be limited to the means disclosed herein for performing the recited function, but are intended to cover in scope any means, known now or later developed, for performing the recited function.

As used herein, "plurality" means two or more.

As used herein, a "set" of items may include one or more of such items.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

As used herein, "and/or" means that the listed items are alternatives, but the alternatives also include any combination of the listed items.

It is claimed:

1. A process for transforming an initial circuit design, the initial circuit design having at least one primary clock and an initial number of secondary clocks derived from the primary clocks, the secondary clocks comprising generated clocks, the initial circuit design further having a plurality of sequential elements clocked by the secondary clocks, and the initial circuit design having an initial amount of clock skew associated with clocking the sequential elements from the secondary clocks, the process comprising producing a transformed circuit design from the initial circuit design having
a transformed number of secondary clocks, wherein the transformed number is less than the initial number
a transformed amount of clock skew, wherein the transformed amount is less than the initial amount
wherein producing a transformed circuit design further comprises
selecting one of the sequential elements, the selected sequential element having a clock input
identifying the generated clock connected to the clock input of the selected sequential element
extracting the cone of logic that produces the generated clock
retiming forward the generated clock cone of logic
creating clock-enable logic for the selected generated clock
inserting the created clock-enable logic into the transformed circuit design
connecting the clock-enable logic to the selected sequential element
re-clocking the selected sequential element from the generated clock to the master clock.

2. The process for transforming an initial circuit design of claim 1,
wherein the secondary clocks further comprise gated clocks, and the initial circuit design includes a gating circuit having a gated clock net that drives a clock input of a selected sequential element, the selected sequential element receiving a first input net at a data input and generating an output net, the gating circuit having a user-defined clock net,
wherein producing a transformed circuit design further comprises
transforming the gating circuit to provide a second input net to the selected sequential element based on a cofactor condition of the gating circuit.

3. The process for transforming an initial circuit design of claim 2, transforming comprising
obtaining an enable net
reconnecting the user-defined clock net and the first input net, wherein reconnecting comprises
disconnecting the gated clock net from clock input of the selected sequential element
connecting the user-defined clock net to the clock input of the selected sequential element
if the selected sequential element has an enable input, then combining the enable net with an existing net connected to the enable input, the combined enable net and the existing net being connected to the enable input
if the selected sequential element does not have the enable input and there is a library element having a library enable input and functionally equivalent to the selected sequential element, then replacing the selected sequential element with the library element
reconnecting output pin and equivalent inputs of the selected sequential element to the library element
connecting the enable net to the library enable input of the library element
removing the selected sequential element.

4. The process for transforming an initial circuit design of claim 1, wherein at least some of the sequential elements have associated therewith respective polarities, the polarities selected from the group comprising rising-edge, falling-edge, active-high, active-low, the process comprising
modifying the polarity of at least one sequential element.

5. The process for transforming an initial circuit design of claim 1, wherein the initial circuit design has original timing requirements, the process comprising
generating multi-cycle path constraints that reflect the original timing requirements.

6. The process for transforming an initial circuit design of claim 1, wherein identifying the generated clock comprises
performing backward propagation from the clock input of the selected sequential element to a point where backward propagation does not reach a top-level port, whereby the clock connected at the point is identified as the generated clock.

7. The process for transforming an initial circuit design of claim 6, wherein performing backward propagation includes
performing backward propagation across inverters and buffers.

8. The process for transforming an initial circuit design of claim 1, wherein extracting the generated clock cone of logic comprises
performing a backward propagation from the clock pin of the selected sequential element, through combinational logic, to primary inputs.

9. The process for transforming an initial circuit design of claim 8, wherein extracting the generated clock cone of logic comprises
performing a backward propagation from the clock pin of the selected sequential element, through combinational logic, to primary inputs.

10. The process of transforming an initial circuit design of claim 1, wherein retiming forward the generated clock of logic comprises
retiming forward all sequential primary input of the generated cone of logic, across combinational logic.

11. The process for transforming an initial circuit design of claim 10, further comprising
optionally replicate the retimed generated cone of logic for each sequential element connected to the generated clock
optionally generate identical routing topology for each replicated generated clock net
aborting any further processing when the retiming process does not entirely reduce the generated clock cone of logic to a single sequential element.

12. The process for transforming an initial circuit design of claim 1, wherein creating the clock-enable logic comprises
generating the rising-edge clock-enable signal by inserting combinatorial gate logic that performs NOT (output of the retimed generated clock sequential element) AND (input of the retimed generated clock sequential element)
generating the falling-edge clock-enable signal by inserting combinatorial gate logic that performs (output of the retimed generated clock sequential element) AND NOT (input of the retimed generated clock sequential element).

13. The process for transforming an initial circuit design of claim 1, wherein connecting the clock-enable logic to the selected sequential element comprises
if the selected sequential element has an enable input, then combining the clock enable net with an existing net connected to the enable input, the combined enable net and the existing net being connected to the enable input
if the selected sequential element does not have the clock enable input and there is a library element having a library enable input and functionally equivalent to the selected sequential element, then replacing the selected sequential element with the library element
reconnecting output pin and equivalent inputs of the selected sequential element to the library element
connecting the clock enable net to the library enable input of the library element
removing the selected sequential element.

14. The process of transforming an initial circuit design of claim 1, wherein re-clocking the selected sequential element from the generated clock to the master clock comprises
disconnecting the generated clock net from the clock input of the selected sequential element
connecting the master clock net to the clock input of the selected sequential element.

15. The process for transforming an initial circuit design of claim 14, further comprising
when the selected sequential element is edge-triggered, changing its polarity to match the polarity of the retimed generated clock sequential element
when the selected sequential element is level-sensitive, changing its polarity to match the opposite polarity of the retimed generated clock sequential element.

16. The process for transforming an initial circuit design of claim 1, further comprising
generating multi-cycle paths or virtual clocks so as to maintain the original timing requirements
modifying user multi-cycle paths so as to maintain the original timing requirements
forward annotating the multi-cycle paths or virtual clocks in the transformed circuit design for downstream implementation tools.

17. The process for transforming an initial circuit design of claim 1, wherein the secondary clocks comprise gated clocks, the process comprising, prior to performing the steps of claim 6, converting gated clocks to reduce the number of secondary clocks and to reduce clock skew.

18. A storage medium having instructions stored thereon which when executed by a processor will cause the processor to transform an initial circuit design, the initial circuit design having at least one primary clock and an initial number of secondary clocks derived from the primary clocks, the secondary clocks comprising generated clocks, the initial circuit design further having a plurality of sequential elements clocked by the secondary clocks, and the initial circuit design having an initial amount of clock skew associated with clocking the sequential elements from the secondary clocks, the process comprising
producing a transformed circuit design from the initial circuit design having
a transformed number of secondary clocks, wherein the transformed number is less than the initial number
a transformed amount of clock skew, wherein the transformed amount is less than the initial amount
wherein producing a transformed circuit design comprises
selecting one of the sequential elements, the selected sequential element having a clock input
identifying the generated clock connected to the clock input of the selected sequential element
extracting the cone of logic that produces the generated clock
retiming forward the generated clock cone of logic
creating clock-enable logic for the selected generated clock
inserting the created clock-enable logic into the transformed circuit design
connecting the clock-enable logic to the selected sequential element
re-clocking the selected sequential element from the generated clock to the master clock.

19. The storage medium for transforming an initial circuit design of claim 18,
wherein the secondary clocks further comprise gated clocks, and the initial circuit design includes a gating circuit having a gated clock net that drives a clock input of a selected sequential element, the selected sequential element receiving a first input net at a data input and generating an output net, the gating circuit having a user-defined clock net,
wherein producing a transformed circuit design further comprises
transforming the gating circuit to provide a second input net to the selected sequential element based on a cofactor condition of the gating circuit.

20. The storage medium for transforming an initial circuit design of claim 19, transforming comprising
obtaining an enable net
reconnecting the user-defined clock net and the first input net, wherein reconnecting comprises
disconnecting the gated clock net from clock input of the selected sequential element
connecting the user-defined clock net to the clock input of the selected sequential element
if the selected sequential element has an enable input, then combining the enable net with an existing net connected to the enable input, the combined enable net and the existing net being connected to the enable input
if the selected sequential element does not have the enable input and there is a library element having a library enable input and functionally equivalent to the selected sequential element, then replacing the selected sequential element with the library element
reconnecting output pin and equivalent inputs of the selected sequential element to the library element
connecting the enable net to the library enable input of the library element
removing the selected sequential element.

21. The storage medium for transforming an initial circuit design of claim 18, wherein at least some of the sequential elements have associated therewith respective polarities, the polarities selected from the group comprising rising-edge, falling-edge, active-high, active-low, the process comprising
modifying the polarity of at least one sequential element.

22. The storage medium for transforming an initial circuit design of claim 18, wherein the initial circuit design has original timing requirements, the process comprising
generating multi-cycle path constraints that reflect the original timing requirements.

23. The storage medium for transforming an initial circuit design of claim 18, wherein identifying the generated clock comprises
performing backward propagation from the clock input of the selected sequential element to a point where backward propagation does not reach a top-level port, whereby the clock connected at the point is identified as the generated clock.

24. The storage medium for transforming an initial circuit design of claim 23, wherein performing backward propagation includes
performing backward propagation across inverters and buffers.

25. The storage medium for transforming an initial circuit design of claim 18, wherein extracting the generated clock cone of logic comprises
performing a backward propagation from the clock pin of the selected sequential element, through combinational logic, to primary inputs.

26. The storage medium for transforming an initial circuit design of claim 25, wherein extracting the generated clock cone of logic comprises
performing a backward propagation from the clock pin of the selected sequential element, through combinational logic, to primary inputs.

27. The storage medium of transforming an initial circuit design of claim 18, wherein retiming forward the generated clock of logic comprises
retiming forward all sequential primary input of the generated cone of logic, across combinational logic.

28. The storage medium for transforming an initial circuit design of claim 27, further comprising
optionally replicate the retimed generated cone of logic for each sequential element connected to the generated clock
optionally generate identical routing topology for each replicated generated clock net
aborting any further processing when the retiming process does not entirely reduce the generated clock cone of logic to a single sequential element.

29. The storage medium for transforming an initial circuit design of claim 18, wherein creating the clock-enable logic comprises
generating the rising-edge clock-enable signal by inserting combinatorial gate logic that performs NOT (output of the retimed generated clock sequential element) AND (input of the retimed generated clock sequential element)
generating the falling-edge clock-enable signal by inserting combinatorial gate logic that performs (output of the retimed generated clock sequential element) AND NOT (input of the retimed generated clock sequential element).

30. The storage medium for transforming an initial circuit design of claim 18, wherein connecting the clock-enable logic to the selected sequential element comprises
if the selected sequential element has an enable input, then combining the clock enable net with an existing net connected to the enable input, the combined enable net and the existing net being connected to the enable input
if the selected sequential element does not have the clock enable input and there is a library element having a library enable input and functionally equivalent to the selected sequential element, then replacing the sequential element with the library element
reconnecting output pin and equivalent inputs of the selected sequential element to the library element
connecting the clock enable net to the library enable input of the library element
removing the selected sequential element.

31. The storage medium of transforming an initial circuit design of claim 18, wherein re-clocking the selected sequential element from the generated clock to the master clock comprises
disconnecting the generated clock net from the clock input of the selected sequential element
connecting the master clock net to the clock input of the selected sequential element.

32. The storage medium for transforming an initial circuit design of claim 31, further comprising
when the selected sequential element is edge-triggered, changing its polarity to match the polarity of the retimed generated clock sequential element
when the selected sequential element is level-sensitive, changing its polarity to match the opposite polarity of the retimed generated clock sequential element.

33. The storage medium for transforming an initial circuit design of claim 18, further comprising
- generating multi-cycle paths or virtual clocks so as to maintain the original timing requirements
- modifying user multi-cycle paths so as to maintain the original timing requirements
- forward annotating the multi-cycle paths or virtual clocks in the transformed circuit design for downstream implementation tools.

34. The storage medium for transforming an initial circuit design of claim 18, wherein the secondary clocks comprise gated clocks, the process comprising, prior to performing the steps of claim 24, convening gated clocks to reduce the number of secondary clocks and to reduce clock skew.

35. A computing system for transforming an initial circuit design, the computing device comprising:
- a processor
- a memory coupled with the processor
- a storage medium having instructions stored thereon which when executed cause the computing device to transform can initial circuit design, the initial circuit design having at least one primary clock and an initial number of secondary clocks derived from the primary clocks, the secondary clocks comprising generated clocks, the initial circuit design further having a plurality of sequential elements clocked by the secondary clocks, and the initial circuit design having an initial amount of clock skew associated with clocking the sequential elements from the secondary clocks, the process comprising
- producing a transformed circuit design from the initial circuit design having
  - a transformed number of secondary clocks, wherein the transformed number is less than the initial number
  - a transformed amount of clock skew, wherein the transformed amount is less than the initial amount
- wherein producing a transformed circuit design comprises
  - selecting one of the sequential elements, the selected sequential element having a clock input
  - identifying the generated clock connected to the clock input of the selected sequential element
  - extracting the cone of logic that produces the generated clock
  - retiming forward the generated clock cone of logic
  - creating clock-enable logic for the selected generated clock
  - inserting the created clock-enable logic into the transformed circuit design
  - connecting the clock-enable logic to the selected sequential element
  - re-clocking the selected sequential element from the generated clock to the master clock.

36. The computing system for transforming an initial circuit design of claim 35,
- wherein the secondary clocks further comprise gated clocks, and the initial circuit design includes a gating circuit having a gated clock net that drives a clock input of a selected sequential element, the selected sequential element receiving a first input net at a data input and generating an output net, the gating circuit having a user-defined clock net,
- wherein producing a transformed circuit design comprises
  - transforming the gating circuit to provide a second input net to the selected sequential element based on a cofactor condition of the gating circuit.

37. The computing system for transforming an initial circuit design of claim 36, transforming comprising
- obtaining an enable net
- reconnecting the user-defined clock net and the first input net, wherein reconnecting comprises
  - disconnecting the gated clock net from clock input of the selected sequential element
  - connecting the user-defined clock net to the clock input of the selected sequential element
- if the selected sequential element has an enable input, then combining the enable net with an existing net connected to the enable input, the combined enable net and the existing net being connected to the enable input
- if the selected sequential element does not have the enable input and there is a library element having a library enable input and functionally equivalent to the selected sequential element, then replacing the selected sequential element with the library element
- reconnecting output pin and equivalent inputs of the selected sequential element to the library element
- connecting the enable net to the library enable input of the library element
- removing the selected sequential element.

38. The computing system for transforming an initial circuit design of claim 35, wherein at least some of the sequential elements have associated therewith respective polarities, the polarities selected from the group comprising rising-edge, falling-edge, active-high, active-low, the process comprising
- modifying the polarity of at least one sequential element.

39. The computing system for transforming an initial circuit design of claim 35, wherein the initial circuit design has original timing requirements, the process comprising
- generating multi-cycle path constraints that reflect the original timing requirements.

40. The computing system for transforming an initial circuit design of claim 35, wherein identifying the generated clock comprises
- performing backward propagation from the clock input of the selected sequential element to a point where backward propagation does not reach a top-level port, whereby the clock connected at the point is identified as the generated clock.

41. The computing system for transforming an initial circuit design of claim 40, wherein performing backward propagation includes
- performing backward propagation across inverters and buffers.

42. The computing system for transforming an initial circuit design of claim 35, wherein extracting the generated clock cone of logic comprises
- performing a backward propagation from the clock pin of the selected sequential element, through combinational logic, to primary inputs.

43. The computing system for transforming an initial circuit design of claim 42, wherein extracting the generated clock cone of logic comprises
- performing a backward propagation from the clock pin of the selected sequential element, through combinational logic, to primary inputs.

44. The computing system of transforming an initial circuit design of claim 35, wherein retiming forward the generated clock of logic comprises
- retiming forward all sequential primary input of the generated cone of logic, across combinational logic.

45. The computing system for transforming an initial circuit design of claim 44, further comprising
- optionally replicate the retimed generated cone of logic for each sequential element connected to the generated clock
- optionally generate identical routing topology for each replicated generated clock net
- aborting any further processing when the retiming process does not entirely reduce the generated clock cone of logic to a single sequential element.

46. The computing system for transforming an initial circuit design of claim 35, wherein creating the clock-enable logic comprises
- generating the rising-edge clock-enable signal by inserting combinatorial gate logic that performs NOT (output of the retimed generated clock sequential element) AND (input of the retimed generated clock sequential element)
- generating the falling-edge clock-enable signal by inserting combinatorial gate logic that performs (output of the retimed generated clock sequential element) AND NOT (input of the retimed generated clock sequential element).

47. The computing system for transforming an initial circuit design of claim 35, wherein connecting the clock-enable logic to the selected sequential element comprises
- if the selected sequential element has an enable input, then combining the clock enable net with an existing net connected to the enable input, the combined enable net and the existing net being connected to the enable input
- if the selected sequential element does not have the clock enable input and there is a library element having a library enable input and functionally equivalent to the selected sequential element, then replacing the selected sequential element with the library element
- reconnecting output pin and equivalent inputs of the selected sequential element to the library element
- connecting the clock enable net to the library enable input of the library element
- removing the selected sequential element.

48. The computing system of transforming an initial circuit design of claim 35, wherein re-clocking the selected sequential element from the generated clock to the master clock comprises
- disconnecting the generated clock net from the clock input of the selected sequential element
- connecting the master clock net to the clock input of the selected sequential element.

49. The computing system for transforming an initial circuit design of claim 48, further comprising
- when the selected sequential element is edge-triggered, changing its polarity to match the polarity of the retimed generated clock sequential element
- when the selected sequential element is level-sensitive, changing its polarity to match the opposite polarity of the retimed generated clock sequential element.

50. The computing system for transforming an initial circuit design of claim 35, further comprising
- generating multi-cycle paths or virtual clocks so as to maintain the original timing requirements
- modifying user multi-cycle paths so as to maintain the original timing requirements
- forward annotating the multi-cycle paths or virtual clocks in the transformed circuit design for downstream implementation tools.

51. The computing system for transforming an initial circuit design of claim 35, wherein the secondary clocks comprise gated clocks, the process comprising, prior to performing the steps of claim 42, converting gated clocks to reduce the number of secondary clocks and to reduce clock skew.

* * * * *